US008850051B2

(12) United States Patent
Bakke et al.

(10) Patent No.: US 8,850,051 B2
(45) Date of Patent: Sep. 30, 2014

(54) METHODS, SYSTEMS, AND COMPUTER PROGRAM PRODUCTS FOR TRANSACTION-BASED INTERNET PROTOCOL (IP) TELEPHONY CALL PROCESSING

(75) Inventors: Steve Bakke, Addison, TX (US); Gerardo Delgadillo, Frisco, TX (US)

(73) Assignee: Broadsoft, Inc., Gaithersburg, MD (US)

( * ) Notice: Subject to any disclaimer, the term of this patent is extended or adjusted under 35 U.S.C. 154(b) by 1588 days.

(21) Appl. No.: 11/356,742

(22) Filed: Feb. 17, 2006

(65) Prior Publication Data

US 2007/0198681 A1 Aug. 23, 2007

(51) Int. Cl.
*G06F 15/16* (2006.01)
(52) U.S. Cl.
USPC ........................................................ 709/230
(58) Field of Classification Search
CPC ...................... H04L 29/06319; H04L 65/1069
USPC ........................................................ 709/230
See application file for complete search history.

(56) References Cited

U.S. PATENT DOCUMENTS

| 6,792,097 | B2 | 9/2004 | Bakke |
| 2004/0199642 | A1* | 10/2004 | Tremblay et al. ............. 709/227 |
| 2007/0140262 | A1* | 6/2007 | Wang ...................... 370/395.52 |
| 2008/0086564 | A1* | 4/2008 | Putman et al. ................ 709/227 |

OTHER PUBLICATIONS

Alan B. Johnston. "SIP Understanding the Session Initiation Protocol". Nov. 2003. Artech House Publishers. 2nd Ed. pp. 17-19, 30-33, 46-53, 71, 126-129.*
G. Camarillo. "RCC3486: Compressing the Session Initiation Protocol". Feb. 2003.*
Kratz et al. Flexible Business Transaction Composition in Service-Oriented Environments. 2005. BETA Working Paper Series.*
Rosenberg et al., "SIP: Session Initiation Protocol," Network Working Group, RFC 3261 (Jun. 2002).

* cited by examiner

*Primary Examiner* — Bryan Lee
(74) *Attorney, Agent, or Firm* — Jenkins, Wilson, Taylor & Hunt, P.A.

(57) ABSTRACT

Methods, systems, and computer program products for transaction-based IP telephony call processing are disclosed. According to one method, a signaling message associated with an IP telephony event is received at an IP telephony node. In response to receiving the signaling message, an IP telephony transaction instance is instantiated to process the signaling message. The signaling message is processed using the IP telephony transaction instance.

28 Claims, 9 Drawing Sheets

TRANSACTION AND CALL FLOW FOR CALL CONTROL

FIG. 6

TRANSACTION AND CALL FLOW FOR CALL HOLD FEATURE

FIG. 7

TRANSACTION AND CALL FLOW FOR CALL TEARDOWN

METHODS, SYSTEMS, AND COMPUTER PROGRAM PRODUCTS FOR TRANSACTION-BASED INTERNET PROTOCOL (IP) TELEPHONY CALL PROCESSING

TECHNICAL FIELD

The subject matter described herein relates to multimedia call processing in a telecommunications environment. More particularly, the subject matter described herein relates to methods, systems, and computer program products for transaction-based Internet protocol (IP) telephony call processing.

BACKGROUND

Telecommunications systems have grown more complex as feature sets increase in both number and complexity. The deployment of new features within conventional sequential state-machine-based call models is increasingly difficult to accomplish due to an increase in the types of traffic carried coupled with subscriber demands for increased connectivity and rapid deployment of new features.

State-machine-based call models have traditionally been implemented for call processing because they facilitate the partitioning of call processing into a granular set of actions based upon the current state of the state machine and the corresponding state of a call. Conventional call models based upon state machines manage call events by call processing activity within a state in response to a call processing trigger event or by a transition to another state. State machines are often nested within other state machines and multiple levels of nesting with large numbers of states are common within state machine-based call models. Because states of state machines have traditionally been designed to be sequential in nature and to rely upon certain timing constraints and actions of other states, the states are highly inter-dependent and rely upon one another to complete the respective partitions of call processing in a timely fashion.

As subscriber demands and the associated system complexity have increased overtime, the nested state machine model has become increasingly difficult to maintain and modify. Each new feature that is added to the call model typically results in additional activity within a state, a new state, or a new nested state machine. Further, new features often require concurrent processing of multiple actions—a task that a single sequential monolithic state machine is inadequately designed to accommodate.

Voice over Internet protocol (VoIP) is an example of a technological advancement that has stressed difficulties associated with the conventional state-machine-based call model. As well, feature sets, such as, call waiting and call forwarding, have increased in number and complexity. Implementing these new technological advancements and features into the monolithic sequential state-machine-based call model has become increasingly difficult to accomplish because so many different timing aspects and states are involved. As new features are integrated into conventional state machines, the state machines become unwieldy and even more difficult to modify for future enhancements. Even well-designed synchronous state machines may experience problems if processing takes longer than what is allotted for a given call state.

Accordingly, in light of these difficulties associated with conventional monolithic sequential state-machine-based call processing, there exists a need for improved methods, systems, and computer program products for transaction-based IP telephony call processing.

SUMMARY

According to one aspect, the subject matter described herein comprises methods, systems, and computer program products for transaction-based Internet protocol (IP) telephony call processing. One method includes receiving, at an IP telephony, a signaling message associated with an IP telephony call event, in response to receiving the signaling message, instantiating an IP telephony transaction instance to process the signaling message, and, processing the signaling message using the IP telephony transaction instance.

The subject matter described herein providing transaction-based IP telephony call processing may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to monolithic state-machine-based call processing, the subject matter described herein provides for transaction-based IP telephony call processing. Where previously a monolithic state machine was responsible for managing all aspects of a call, the methods, systems, and computer program products described herein operate on a transaction-based model to provide a more flexible and more adaptive call model to accommodate the fast-evolving IP networks, new end-user devices and new service features. By adapting the call model from the conventional state-machine-based model to a transaction-based model, call model management, modification and evolution may be improved. Transaction-based IP telephony call processing may operate based upon IP telephony events, such as a SIP registration event, a SIP call setup event, or a SIP call teardown event.

SIP has become widely used for the signaling associated with the setup and teardown on IP-based multimedia communications. Accordingly, SIP will be used to describe the subject matter herein. However, it is understood that the subject matter described herein may be used for other forms of call processing. For example, the transaction-based IP telephony call processing methods and systems described herein can be used with an IP telephony signaling protocol, such as signaling transport (SIGTRAN) protocols like stream control transmission protocol (SCTP), SS7 over IP, H.323, or any other protocol used for IP-based calls.

Figure 1:
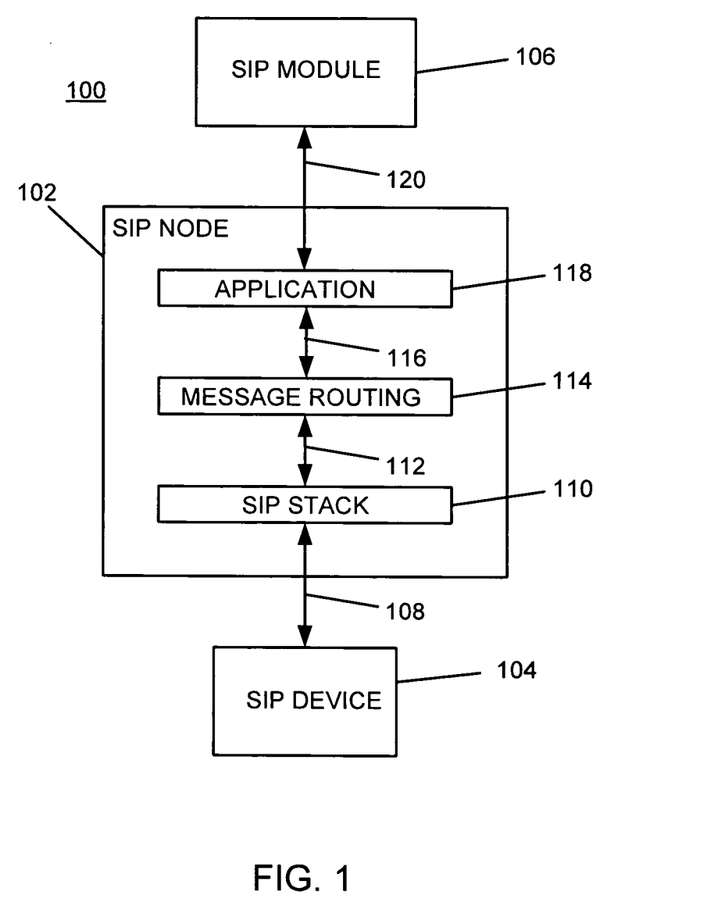
FIG. 1 is a block diagram of an exemplary SIP communication environment for transaction-based IP telephony call processing according to an embodiment of the subject matter described herein.

FIG. 1 illustrates an exemplary SIP communication environment 100 for transaction-based IP telephony call processing. A SIP node 102 within SIP communication environment 100 may facilitate communication between a SIP device 104 and a SIP module 106. SIP node 102 may be a SIP application server, while SIP device 104 and SIP module 106 may each be a SIP phone, a SIP gateway, a SIP media server, or any other device capable of communication using SIP.

When SIP device 104 generates a SIP message, it may be received by SIP node 102 on a SIP interface 108 and passed to a SIP stack 110. SIP stack 110 may be a standard SIP stack capable of performing network, parsing, and re-transmission services typically performed by user agent devices.

When SIP stack 110 parses the SIP message and determines that it should be routed internally rather than re-transmitted, SIP stack 110 may convert the SIP message to an application programming interface (API) compliant SIP message and forward the API-based SIP message over an API interface 112 to a message routing module 114. API interface 112 may include any message-based, class-oriented communication capabilities, such as those available with C++, Java, and other object-oriented programming models. The conversion of the SIP message into an API-based SIP message may allow for faster internal processing. Because SIP is a text-based messaging format, a text-based SIP message would need to be parsed at each module that handles the message if it were preserved in the text-based format. Accordingly, by conversion of the text-based SIP message into an API-based message, direct object-to-object communication with associated behavioral triggering may be achieved.

Message routing module 114 may, as will be described in more detail below, further route the API-based SIP message over an API interface 116 to an application module 118. Application module 118 may, as will be described in more detail below, determine the final destination of the API-based SIP message and may reformat the API-based SIP message to comply with any external communication interface, such as, a SIP interface 120 for delivery to the SIP module 106. SIP interface 120 may include any interface capable of communication to a SIP component. Application module 118 may convert the API-based SIP message to any desirable format. For example, application module 118 may convert the API-based SIP message back to a text-based SIP message for transmission over a standard SIP interface. As well, application module 118 may convert the API-based SIP message to a binary version of SIP. A binary version of SIP may provide for faster parsing of SIP messages by destination components.

Figure 2:
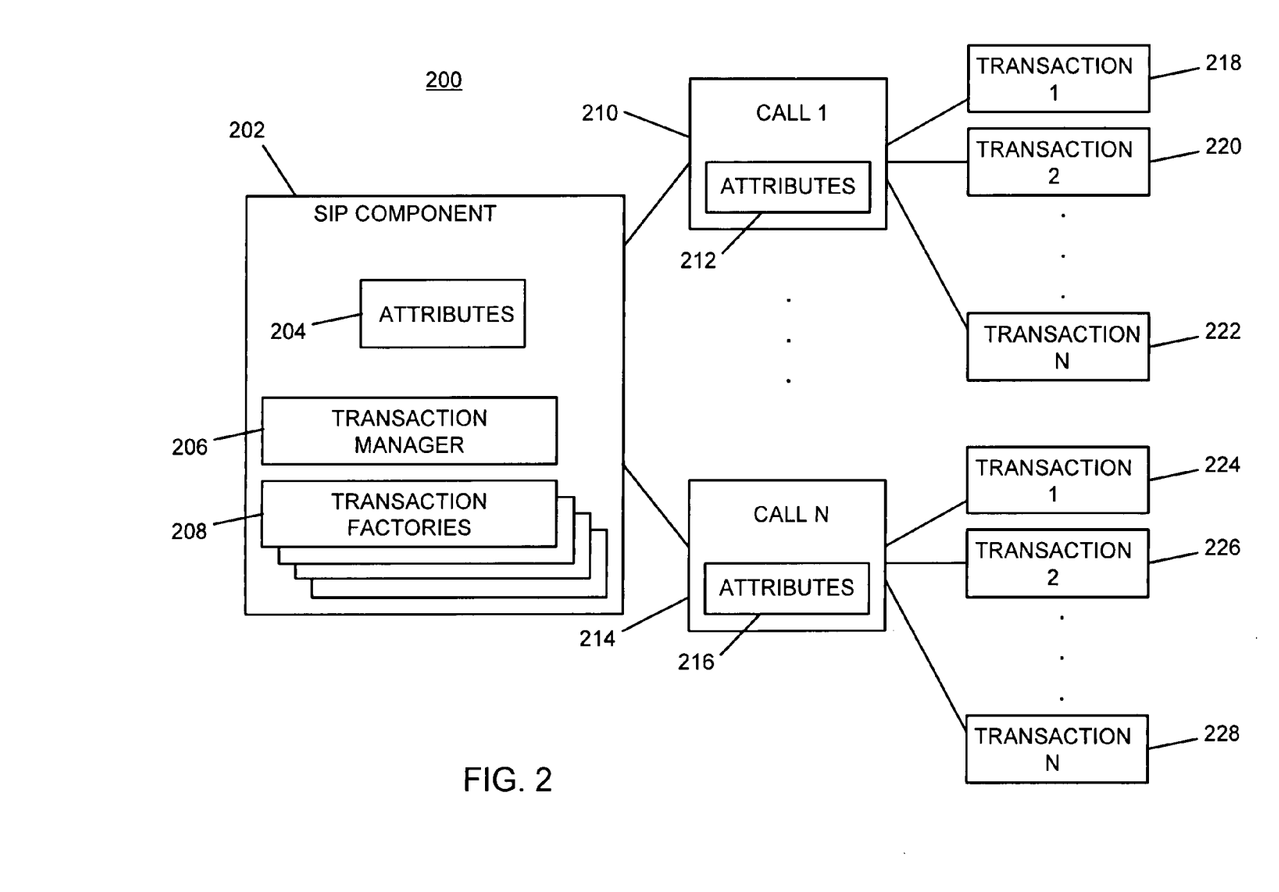
FIG. 2 is a block diagram of an exemplary transaction-based call model for managing IP telephony call processing in a transaction-oriented fashion according to an embodiment of the subject matter described herein.

FIG. 2 illustrates an exemplary transaction-based call model 200 for managing IP telephony call processing in a transaction-oriented fashion. Transaction-based call model 200 may be implemented by any application executing on a SIP node, such as application module 118 of SIP node 102.

In contrast to conventional state-machine-based call management, transaction-based call model 200 may manage calls on a transaction-by-transaction basis without many of the problems described above for state-machine based call processing. As will be described in more detail below, the granularity of transactions within transaction-based call model 200 may facilitate modularity of transaction definitions and may simplify support for simultaneous call flows.

A SIP component 202 may be a class-based component capable of being instantiated to represent a physical device. For example, SIP component 202 may be capable of representing a SIP phone, a SIP gateway, a SIP media server, or any other device capable of communication using any form of SIP-based communication. Transaction-based call model 200 may be implemented in any architectural manner capable of allowing object-based communication. For example, SIP component 202 may be instantiated from a class definition, such as for example, a C++ or java class.

Data related to SIP component 202 may be stored as attributes in an attributes area 204. Attributes stored in attributes area 204 may include data representing the functional capabilities of the physical device modeled by SIP component 202. SIP component 202 may be viewed as the central point of communication where outside SIP messages and internal messages are translated from one form to another to facilitate call setup, call processing, and call teardown. These translations may include translating from one protocol to another. For example, SIP may be translated to media gateway control protocol (MGCP), skinny client control protocol (SCCP), and MITEL, or these protocols may be translated to SIP. In order to facilitate these translations, a transaction manager 206 may be used to associate message triggers with appropriate translations and transactions. Transaction manager 206 is an IP-service-based application server capable of instantiating instances corresponding to IP telephony components and IP telephony transactions using information stored, for example, in a database. Once a trigger condition is met, transaction manager 206 may direct a transaction factory within transaction factories 208 to set up, process, or tear down a call, as appropriate. Transaction manager 206 is an entity that manages transactions and routes incoming signaling messages to the appropriate transaction for transaction-based IP telephony call processing. Transaction manager 208 may poll transaction factories within transaction factories 208 until a transaction factory responds that it is interested in processing the incoming signaling message. Transaction factories 208 are entities that may manage the instantiation of transaction instances. In response to determining that processing by an instance that may be instantiated by the respective transaction factory is appropriate, the respective transaction factory may instantiate a transaction to process the incoming message, as will be describe in more detail below. Exemplary transaction factories include phone line features transactions, keep alive transactions, session timer transactions, invite inbound transactions, and invite outbound transactions.

The processes of setting up, processing, and tearing down a call within transaction-based call model 200 will be described in more detail below. For now it should be noted that calls may be instantiated by SIP component 202 in response to an incoming message that is not associated with an instantiated call. The transaction factories within transaction factories 208 may then be called to determine whether any instantiated object should process the message. If no transaction is instantiated to process the incoming message, the call may be destroyed.

SIP component 202 may either be provisioned for static devices (e.g., media gateways, etc.) or instantiated on demand as devices (e.g., phones, etc.) register with a system. Alternatively, a SIP component 202 may be provisioned statically as devices (e.g., phone, etc.) are placed into service at load time. Calls and the transactions that manage call functionality within transaction-based call model 200 may be instantiated on demand and released when their function has completed, as will be described in more detail below.

A call 1 210 with attributes stored in an attributes area 212 may be instantiated to represent a call within transaction-based call model 200. For example, when a SIP INVITE message is received at a component, such as SIP component 202, call 1 210 may be instantiated to process the SIP INVITE message and any subsequent messages associated with call 1 210. Many calls may co-exist with call 1 210. Accordingly, any number of calls, up to and including, a call N 214 with attributes stored in an attributes area 216 may co-exist. As described above, in a departure from the conventional state-machine-based call management model, transaction-based call model 200 may manage calls in a transaction-oriented fashion.

As a foundation for the transactional call model of transaction-based call model 200, each call may have a collection of transactions associated with it. Each transaction may manage a small portion of call processing for a call and may operate concurrently or sequentially. For example, call 1 210 may have a transaction 1 218, a transaction 2 220, up to a transaction N 222. Likewise, call N 214 may have a transaction 1 224, a transaction 2 226, up to a transaction N 228.

A transaction instance, such as, transaction 1 218, may perform well-defined call processing tasks like call setup, call teardown, collection of digits, and other call-related activities. A set of transactions may collectively implement a call model or a service feature, such as call waiting, call hold, or call forwarding. Each transaction may be designed to be sufficiently modular to allow reuse in multiple features and multiple call models. By partitioning the functionality of transactions in a granular fashion, modularity may be improved. Accordingly, reuse of small transactions may be enabled with transactions viewed as building blocks of a call model or service feature.

A transaction instance may be instantiated in response to an incoming trigger and may destroy itself when its functional processing is completed, thereby alleviating system overhead for the release of any associated resources. If any transactions are still active and the owner call gets destroyed, the active transactions may also be destroyed, thereby alleviating system overhead for the release of any associated resources.

One example of a modular transaction trigger that may be reused at multiple call processing stages is an "Invite_Inbound" trigger. An "Invite_Inbound" trigger and an associated transaction instance may be reused for call setup, call hold, call transfer, session timers, and other service features that respond to SIP INVITE messages.

As can be seen from FIG. 2, SIP component 202 may have one or more calls and each call may have one or more transactions associated with it. As described above, transactions may operate concurrently or sequentially depending upon the call processing activity to be performed and the granularity provided within the set of call processing transactions.

Accordingly, to facilitate call processing and to simplify modular transaction design, a transaction may need to exchange data with another transaction to provide information for future stages of call processing. This data exchange may be achieved through a transaction-specific data repository, such as for example, attributes area 212. Multiple attributes may be stored in attributes area 212, and attributes may survive the termination of a transaction to be used by later-instantiated transactions. Subsequent transactions may be responsible for cleaning up attributes area 212 following use of attributes deposited by prior transactions. Multiple call attributes areas may be created to enable more complex call processing without departure from the subject matter described herein.

As an example of attribute-based communication between transactions, a "Phone_Register" transaction may save an expiration time stamp in a call attributes area, such as for example, attributes area 212. At appropriate intervals, another transaction may check this time stamp to determine whether it has expired. If the time stamp has expired, the other transaction may take the phone out of service. As another example of inter-transaction communication, a "Phone_Hold" transaction may save a "call hold" attribute to attributes area 212 when a phone associated with a SIP component, such as, SIP component 202, is put on hold. Another transaction may look at the "call hold" attribute in attributes area 212 and may respond to the "call hold" attribute. For example, a "Phone_Resume" transaction may be triggered if a hold attribute is present in attributes area 212. Accordingly, transactions may perform the majority of the work to manage call setup, processing, and teardown.

Figure 3:
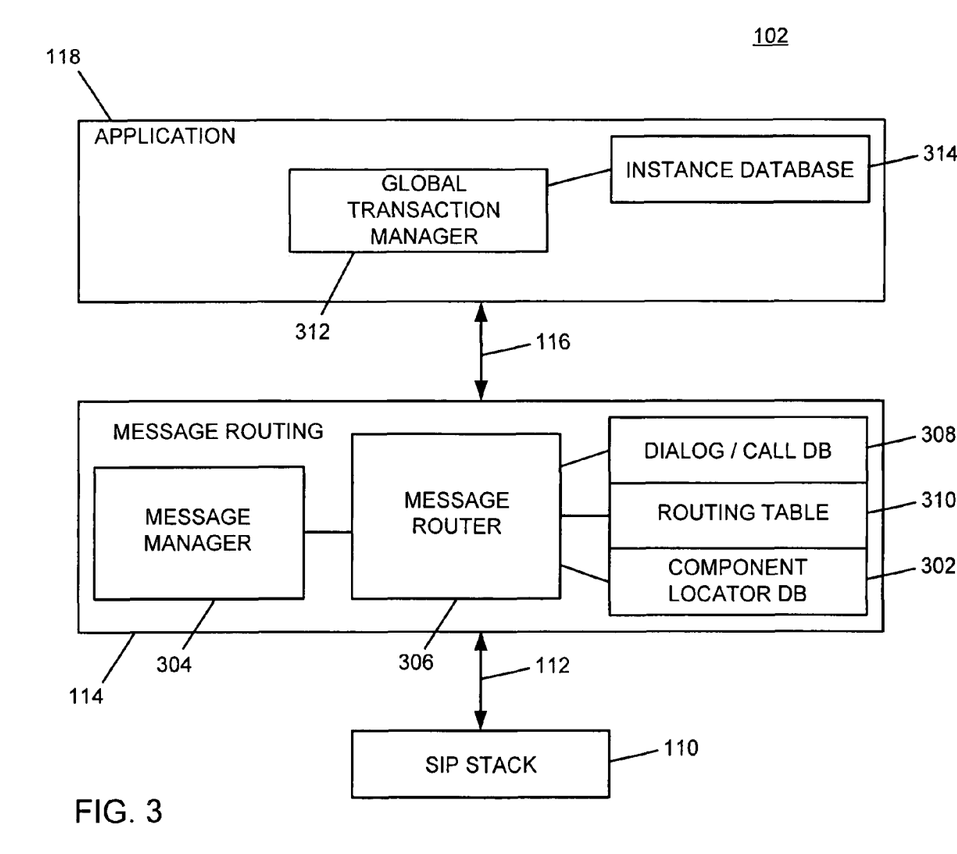
FIG. 3 is a magnified block diagram of an exemplary SIP communication environment for transaction-based IP telephony call processing according to an embodiment of the subject matter described herein.

FIG. 3 illustrates a magnified view of SIP node 102 to facilitate a more detailed description of message routing module 114 and application module 118. Generally, the identification of components, calls, and transactions for message routing purposes may be performed by the use of fields within a SIP message. For example, a SIP message may be routed to a component representing a physical device by use of the user name that is present in a "From" header field and the device's current IP address present in the top "Via" header parameter of the SIP message. The component representing the device may then route the SIP message to the associated call using the "Call-ID" field in the SIP message. The associated call may then route the SIP message to the associated transaction using the "CSeq" field of the SIP message. As described above, a transaction factory may instantiate transactions when a SIP message arrives for a transaction that is not presently instantiated.

Message routing module 114 may locate components within the system to send SIP messages to and may provide for the static and dynamic binding of components to routing table entries, as will be described in more detail below. At system start-up time, all components within the system that model SIP devices, such as, SIP phones, media gateways, and media servers, may be provisioned into a component locator database 302. Accordingly, as will be described in more detail below, a component may be found within component locator database 302 when unavailable in other call processing databases.

In order to identify a target component associated with an incoming SIP message, message routing module 114 may perform a three-level lookup sequence for any message received. A message manager 304 may be responsible for initial receipt and subsequent forwarding of any SIP message. In order to determine how to route a received SIP message, message router 306 may begin the three-level lookup in an active dialog/call database 308 to determine whether the target component is already associated with an in-progress session, call, or dialog. If no entry is found within dialog/call database 308 for the in-progress session, call, or dialog associated the target component, message router 306 may perform a second lookup in routing table 310 to search for active components. If the target component for the SIP message is not found in routing table 310, a third lookup may be performed in the provisioned component locator database 302. If the target component is found at any level of the three-level lookup, the SIP message may be routed to the target component by message manager 304. If the targeted component is not found within any of the three-level lookup databases, appropriate error-handling procedures may be implemented. For simplicity, error-handling procedures will not be described herein.

As described above, component locator database 302 may be statically provisioned. Component locator database 302 may also be dynamically loaded. For example, most phones register with a call agent to allow SIP message routing within a system. Information in a SIP REGISTER message may be used to locate a SIP phone component entry in component locator database 302. A search of component locator database 302 may be categorized based upon message types associated with any component type for increased performance. Once a target component is located in component locator database 302, an entry in routing table 310 may be made to improve performance for future message routing to the target component. Likewise, when a target component is located within routing table 310 in response to, for example, a SIP INVITE message, a call or dialog instance may be created in dialog/call database 308.

Routing table 310 may be organized as a tree where a host name can have one or more user name entries. Accordingly, each entry of routing table 310 may have two key fields, host name and user name, as shown in table 1 below.

TABLE 1

Exemplary Routing Table Entries

| Host Name | User Name |
|---|---|
| Gateway - 111.222.333.400 | * (e.g., any user) |
| SIP Internet access device (IAD) - 111.222.333.440 | 4035550001 |
| | 4035550002 |
| SIP Phone - 111.222.333.480 | 4035551023 |

As can be seen from Table 1, the host name field may include a text entry describing the type of component and an IP address for the specific device. The user name field may include any entry usable for routing SIP messages. The user name field may also include a wild card entry, such as for example, an asterisk (e.g. "*") for use with devices that do not have a user name (e.g., gateways, etc.). Gateways usually statically register to routing table 310 and host name routing using an IP address for the device may be used.

Phones may dynamically register to routing table 310. Phones dynamically provision due to the fact that phones typically use dynamic host configuration protocol (DHCP) which allocates a new IP address each time a phone registers. Accordingly, the host name for a phone is an IP address that is dynamic in nature and routing table entries for phones may be dynamically created within routing table 310 when a phone registers.

As described above, dialog/call database 308 may store entries associated with active dialogs or calls. Dialog/call database 308 may store entries and be searched by the "Call-ID" field of a SIP message.

When the target component has been identified by message router 306, message manager 304 may forward the SIP message as an API-based SIP message over API interface 116 to application module 118. At the core of application module 118 is a transaction-based call model, such as for example, transaction-based call model 200. For example, application module 118 may instantiate the transaction-based call model components illustrated in FIG. 2. Finely granularized transactions may be crafted to avoid monolithic class definitions and to facilitate transaction reuse. Complex state machines that were previously used in conventional state machine-based systems to keep track of and support simultaneous call flows are no longer needed. As described above in relation to FIG. 2, the application layer may include three logical sub-layers: a component sub-layer, a call sub-layer, and a transaction sub-layer. These logical sub-layers may be implemented within application module 118 as will be described in more detail below.

A global transaction manager 312 may manage transaction factory-level actions and may track the instantiation of transaction instances. An instance database 314 may be used to store any instantiated entities. For example, instance database 314 may store all transaction factory instances, call instances, and transaction instances. When a component is identified to process a call, the component may be associated within instance database 314 with the transaction factories that it requires to instantiate transactions for call processing. As well, a call may be instantiated within instance database 314 by the component and an appropriate transaction instance may be instantiated to process the signaling message. Global transaction manager 312 may track all instantiated entities within instance database 314.

As SIP messages arrive directed toward components, corresponding calls and transactions may be instantiated within instance database 314 to receive the SIP message and process it. In the case of a call setup message, for example, a call instance and an associated call setup transaction may be instantiated, as will be described in more detail below. As application module 118 populates with instantiated components and as call loads increase, global transaction manager 312 may monitor component loads and generate statistics that may be used for performance enhancement activities and monitoring.

Global transaction manager 312 may also list all transaction factories in the system by name. The transaction factories, in turn, may be responsible for instantiating specific transactions. A transaction may be instantiated by a component-level transaction factory in response to events, such as for example, an "Invite_Inbound" transaction in response to receiving a SIP INVITE message. Upon receipt of an incoming message, the transaction manager associated with the component may poll transaction factories associated with the component to determine which transaction factory should instantiate a component to process the incoming message. As described above, transactions may destroy themselves when processing is completed and destruction of calls may also destroy any associated transactions.

As an example of transactions which may be instantiated for a component, a SIP media server may be described. A SIP media server component associated with a SIP media server device may have a transaction manager, such as, a transaction manager 206, to manage four transactions: a call setup transaction, a call teardown transaction, a re-invite transaction, and a play file transaction. Granularity of transaction class definition may be used to limit stateful behavior and to reduce complexity.

As described above in relation to FIG. 2, an attributes area, such as attributes area 212, may be utilized to manage transactions and interactions between transactions. Any stateful behavior may be encapsulated within a transaction to remove state-based interdependencies from transaction class design. Any data persistence may be achieved through the use of attributes area 212. Accordingly, transactions may be made more manageable for reuse and enhancement over time.

Figure 4:
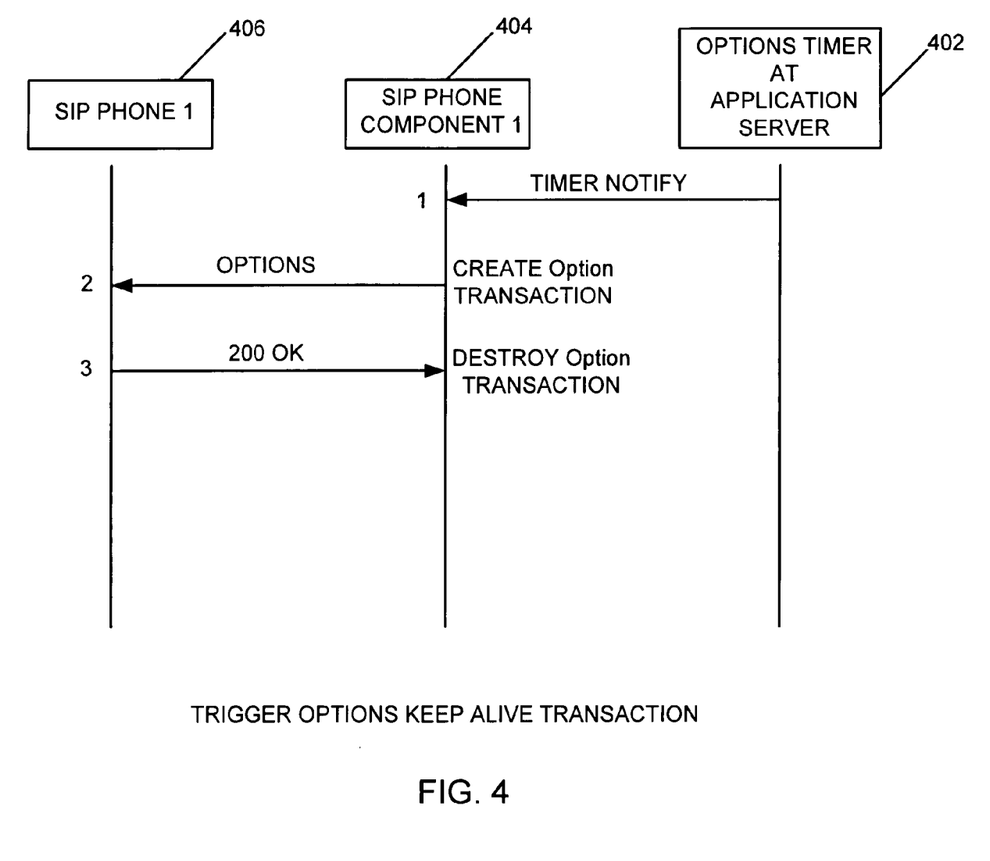
FIG. 4 is a message flow diagram illustrating exemplary messages associated with a triggering transaction according to an embodiment of the subject matter described herein.

With the description above of SIP node 102 and transaction-based call model 200, message flows will now be described. FIG. 4 is a message flow diagram illustrating exemplary messages associated with a triggering transaction that may be processed by SIP components instantiated by an application, such as application 118 according to an embodiment of the subject matter described herein. In FIG. 4, an options timer 402 at an application server, an instantiated SIP phone component 404, and a SIP phone 406 are in communication with each other. Referring to FIG. 4, in line 1 of the message flow diagram, an options timer 402 at an application server expires and formulates and a TIMER NOTIFY trigger to a SIP phone component 1 404. In line 2 of the message flow diagram, SIP phone component 1 404 formulates a SIP OPTIONS message and forwards the SIP OPTIONS message to a SIP phone 1 406. In line 3 of the message flow diagram, SIP phone 1 406 responds with a SIP 200 OK message. The message flow diagram of FIG. 4 may be used when registration of SIP phone component 1 404 expires. The TIMER NOTIFY event in line 1 triggers the creation of an "Option" transaction associated with SIP phone component 1 404 and the "Option" transaction associated with SIP phone component 1 404 in turn sends the SIP OPTION message as a "ping" message in line 2 to SIP phone 1 406. SIP phone 1 406 sends the SIP 200 OK message in line 3 as a "Keep-Alive" message. When SIP phone component 1 404 receives the SIP 200 OK message in line 3 of the message flow diagram, the "Option" transaction may be destroyed. As described above, the "Option" transaction may destroy itself upon receipt of the SIP 200 OK message.

Figure 5:
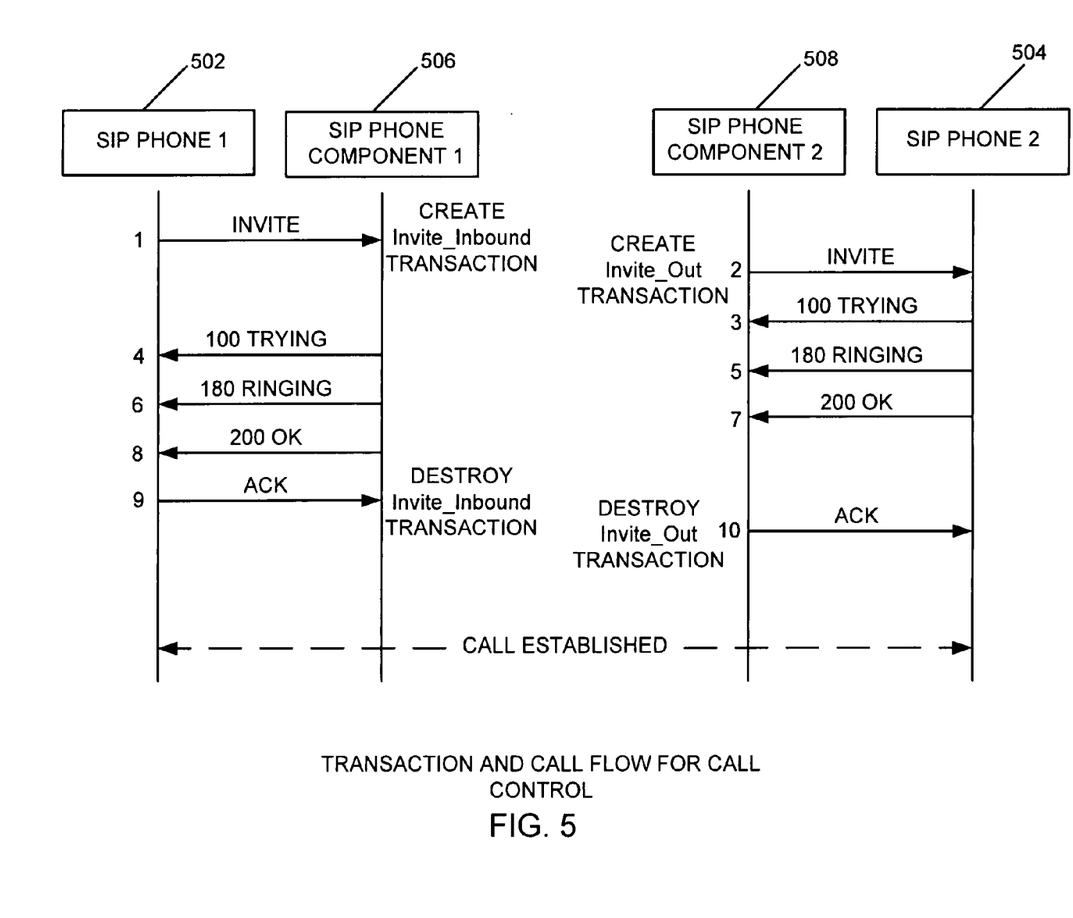
FIG. 5 is a message flow diagram illustrating exemplary messages associated with a call setup between two SIP phones according to an embodiment of the subject matter described herein.

FIG. 5 is a message flow diagram illustrating exemplary messages associated with a call setup between two SIP phones 502 and 504. SIP phone component 1 506 and SIP phone component 2 508 may be transaction-based components instantiated by an application to handle the transaction according to an embodiment of the subject matter described herein. Referring to FIG. 5, in line 1 of the message flow diagram, SIP phone 1 502 sends a SIP INVITE message to a SIP phone component 1 506. SIP phone component 1 506 interprets the SIP INVITE message and instantiates an "Invite-Inbound" transaction in response to the SIP INVITE message. Via internal API messaging, as described above, SIP phone component 2 508 may be identified as the destination for the SIP INVITE message. SIP phone component 2 508 may instantiate an "Invite_Out" transaction and, in line 2 of the message flow diagram, may formulate and send a SIP INVITE message to SIP phone 2 504.

SIP phone 2 504 may respond in line 3 of the message flow diagram with a provisional SIP 100 TRYING message to indicate that it is trying to process the SIP INVITE message. Via internal API messaging, as described above, the "Invite_Out" transaction associated with SIP phone component 2 508 may forward SIP 100 TRYING message to the "Invite_Inbound" transaction associated with SIP phone component 1 506. SIP phone component 1 506 may formulate and send a SIP 100 TRYING message in line 4 of the message flow diagram to SIP phone 1 502.

SIP phone 1 502 has no requirement to respond to the provisional SIP 100 TRYING message in line 4 of the message flow diagram. In line 5 of the message flow diagram, SIP phone 2 504 may send a SIP 180 RINGING message that may be communicated via internal API messaging as described above by the "Invite_Out" transaction associated with SIP phone component 2 508 to the "Invite_Inbound" transaction associated with SIP phone component 1 506. In response, SIP phone component 1 506 may formulate and send a provisional SIP 180 RINGING message in line 6 of the message flow diagram to SIP phone 1 502.

When SIP phone 2 504 is answered, SIP phone 2 504 may send a SIP 200 OK message in line 7 of the message flow diagram to indicate that communication may begin and that a dialog between SIP phone 1 502 and SIP phone 2 504 may be established. As described above, the "Invite_Out" transaction associated with SIP phone component 2 508 may communicate the SIP 200 OK message to the "Invite_Inbound" transaction associated with SIP phone component 1 506 via internal API communications. In response, the "Invite_Inbound" transaction associated with SIP phone component 1 506 may formulate and send a SIP 200 OK message in line 8 of the message flow diagram to SIP phone 1 502.

In line 9 of the message flow diagram, SIP phone 1 502 may respond to the SIP 200 OK message with a SIP ACK message. The "Invite_Inbound" transaction associated with SIP phone component 1 506 may forward the SIP ACK message of line 9 to the "Invite_Out" transaction associated with SIP phone component 2 508 and the "Invite_Inbound" transaction associated with SIP phone component 1 506 may destroy itself, thereby, removing the instantiated resources from the system. The "Invite_Out" transaction associated with SIP phone component 2 508 may formulate and send a SIP ACK message in line 10 of the message flow diagram to SIP phone 2 504 and may destroy itself, thereby, removing the instantiated resources from the system. Upon receipt of the SIP ACK message in line 10 of message flow diagram, a SIP call has been established between SIP phone 1 502 and SIP phone 2 504.

The interface between SIP phone 1 502 and SIP phone component 1 506, and the interface between SIP phone 2 504 and SIP phone component 2 508, may be text-based SIP interfaces, binary-based SIP interfaces, or any other proprietary protocol such as VIP. As well, any other protocol suitable of communication with a physical device may be substituted for the messaging described above in FIG. 5 without departure from the scope of the subject matter described herein. Furthermore, the SIP devices represented may be other devices, such as, for example, media gateways or other physical devices without departure from the scope of the subject matter described herein.

Figure 6:
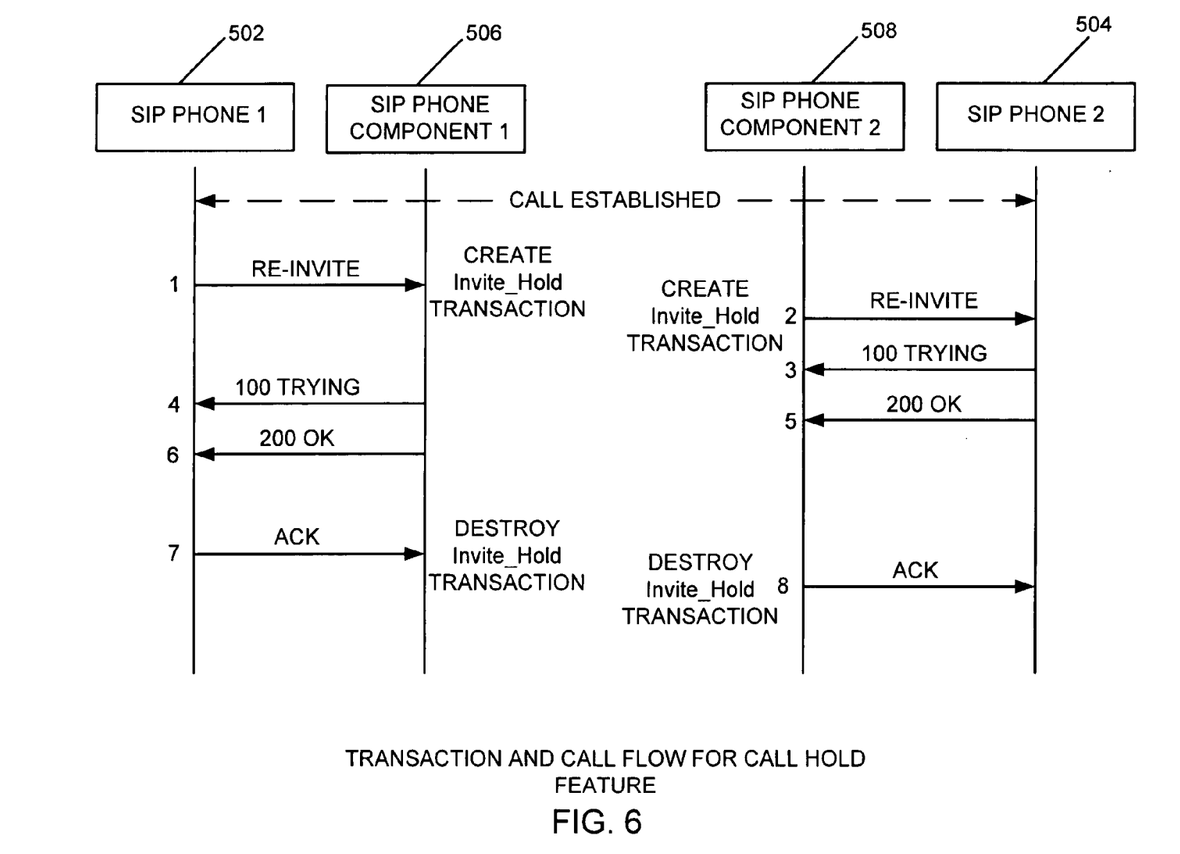
FIG. 6 is a message flow diagram illustrating transaction and call flow for a call hold feature beginning from a point of an established call according to an embodiment of the subject matter described herein.

FIG. 6 is a message flow diagram illustrating transaction and call flow for a call hold feature beginning from a point of an established call. The message flow in FIG. 6 may, but need not, continue from the call establishment of FIG. 5. Accordingly, the same devices and components are used in FIG. 6. Furthermore, with the description of FIG. 5 as a basis, the message flows of FIG. 6 may be more readily understood. It is also understood that the same device and interface variations described above in relation to FIG. 5 apply to FIG. 6 as well.

Referring to FIG. 6, in line 1 of the message flow diagram, SIP phone 1 502 may send a SIP RE-INVITE message to initiate a call hold transaction. In response, SIP phone component 1 506 may instantiate an "Invite_Hold" transaction. Through internal API messaging, SIP phone component 1 506 may communicate the SIP RE-INVITE message to SIP phone component 2 508. In response, SIP phone component 2 508 may instantiate an "Invite_Hold" transaction, and may formulate and send a SIP RE-INVITE message to SIP phone 2 504 in line 2 of the message flow diagram. In line 3 of the message flow diagram, SIP phone 2 504 may send a SIP 100 TRYING message which may be processed, as described above, by the respective "Invite_Hold" transactions associated with SIP phone component 2 508 and SIP phone component 1 506 to formulate and send a SIP 100 TRYING message to SIP phone 1 502 in line 4 of the message flow diagram.

In line 5 of the message flow diagram, SIP phone 2 504 may send a SIP 200 OK message which is communicated through the internal API between the two "Invite_Hold" transactions to result in a SIP 200 OK message in line 6 of the message flow diagram from SIP phone component 1 506 to SIP phone 1 502. In response, SIP phone 1 502 may send a SIP ACK message in line 7 of the message flow diagram. The "Invite_Hold" transaction associated with SIP phone component 1 506 may forward the SIP ACK message of line 7 in the message flow diagram through the internal API to the "Invite_Hold" transaction of SIP phone component 2 508, and the "Invite_Hold" transaction associated with SIP phone component 1 506 may then destroy itself and remove its instantiated resources from the system. In response to receiving the API-based SIP ACK message, the "Invite_Hold" transaction associated with SIP phone component 2 508 may formulate and send a SIP ACK message to SIP phone 2 504 in line 8 of the message flow diagram, and may destroy itself and remove its instantiated resources from the system.

At this point in the message flow, the call between SIP phone 1 502 and SIP phone 2 504 has been placed on hold. Though not depicted in FIG. 6, a message flow similar to that of FIG. 5 including the creation of new "Invite_inbound" and "Invite_Out" transactions may be used to re-establish the call communication.

Figure 7:
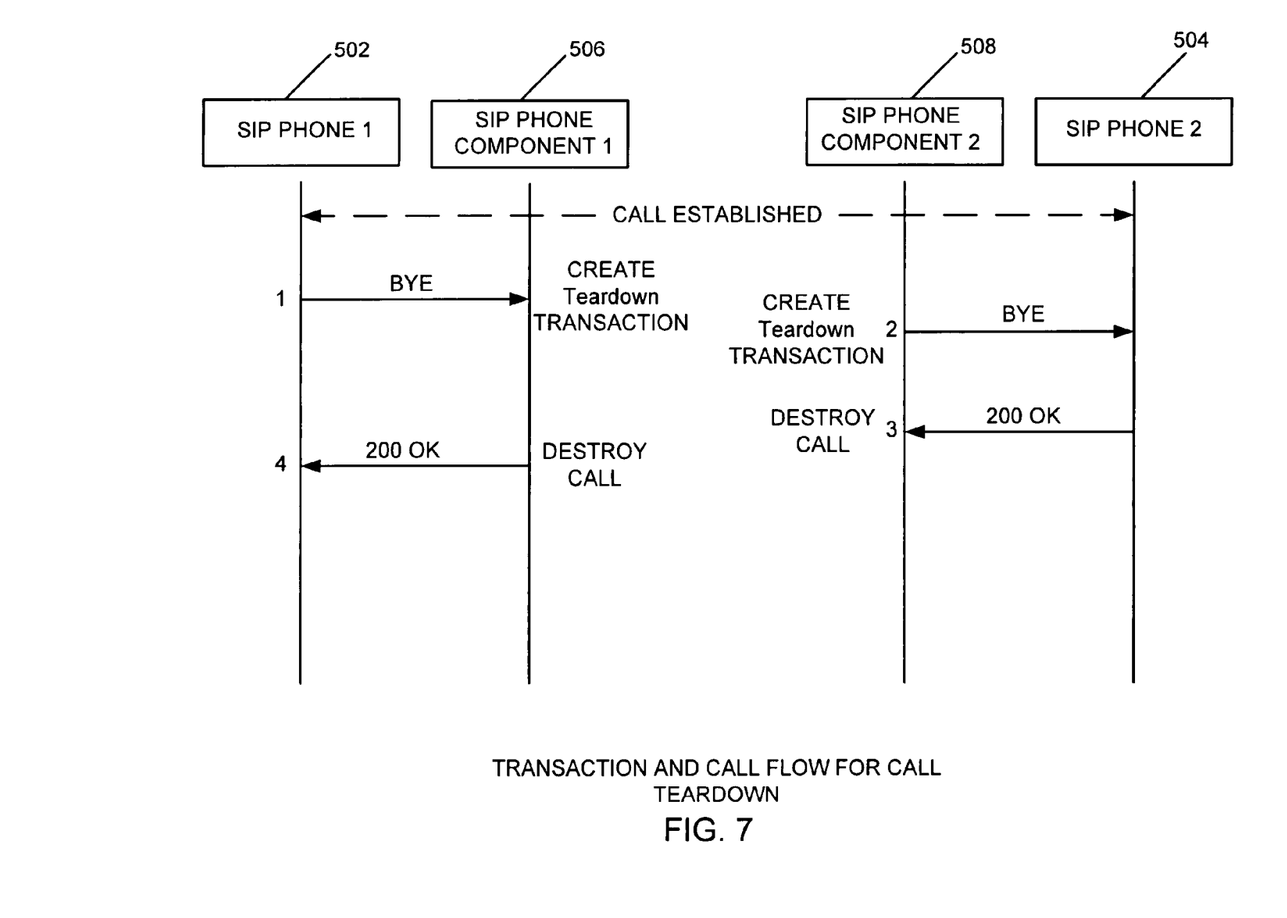
FIG. 7 is a message flow diagram illustrating a transaction and call flow for call teardown according to an embodiment of the subject matter described herein.

FIG. 7 is a message flow diagram illustrating a transaction and call flow for call teardown. As with FIGS. 5 and 6, there are many possible variations for the devices and device interfaces. Accordingly, any and all are considered within the scope of the subject matter described herein.

Referring to FIG. 7, in line 1 of the message flow diagram, a SIP BYE message is sent from SIP phone 1 502 to SIP phone component 1 506. In response, SIP phone component 1 506 may instantiate a "Teardown" transaction which may forward the SIP BYE message through the internal API-based communication to SIP phone component 2 508. In response, a "Teardown" transaction may be instantiated at SIP phone component 2 508, and a SIP BYE message may be formulated and sent to SIP phone 2 504 in line 2 of the message flow diagram. In response to receiving the SIP BYE message, SIP phone 2 504 may send a SIP 200 OK message in line 3 of the message flow diagram. Upon receipt, the "Teardown" transaction at SIP phone component 2 508 may forward the SIP 200 OK through the internal API-based communication channels to SIP phone component 1 506.

Because this is a call teardown transaction, the call may be destroyed after communicating the SIP 200 OK message through the internal API to SIP phone component 1 506. Accordingly, in response to communicating the SIP 200 OK message through the internal API, SIP phone component 2 508 may destroy the call and, thereby, release all instantiated resources associated with the call, including any transactions, such as, the "Teardown" transaction, from the system.

In response to receiving the API-based SIP 200 OK message, SIP phone component 1 506 may formulate and send a SIP 200 OK message in line 4 of the message flow diagram and may destroy the call instantiation associated with SIP phone component 1 506. As described above, the destruction of a call instance will also destroy all transaction instances associated with it, including for example, the "Teardown" transaction, and will release any instantiated resources associated with the call and any transactions from the system.

Figure 8:
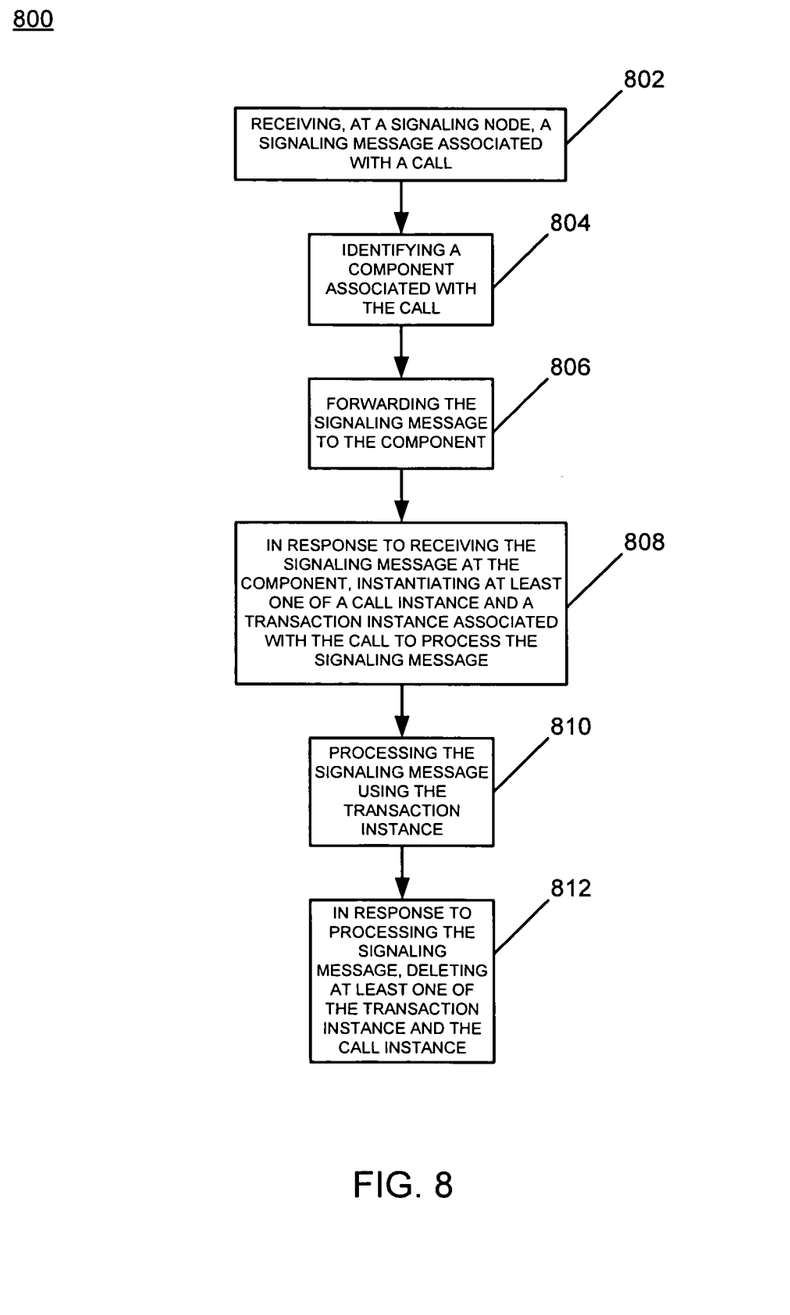
FIG. 8 illustrates an exemplary transaction-based call process for processing calls based upon a transactional call model using transaction instantiation for message processing according to an embodiment of the subject matter described herein.

FIG. 8 illustrates an exemplary transaction-based call process 800 for transaction-based SIP call processing using transaction instantiation for message processing. At block 802, process 800 may receive, at a signaling node, a signaling message associated with a call. For example, a SIP INVITE message may be received at a signaling node such as SIP NODE 102.

At block 804, process 800 may identify a component associated with the call. For example, SIP component 202 may be identified as associated with the call to be established by a SIP INVITE message.

At block 806, process 800 may forward the signaling message to the component. For example, the SIP INVITE message may be forwarded over API-based interface 116 to SIP component 202.

At block 808, process 800 may in response to receiving the signaling message at the component, instantiating at least one of a call instance and a transaction instance associated with the call to process the signaling message. For example, for the case of a SIP INVITE message, call 1 210 and transaction 1 218 may both be instantiated. For other messages, call 1 210 may already exist and transaction 1 218 may be instantiated.

At block 810, process 800 may process the signaling message using the transaction instance. For example, transaction 1 218 may formulate and send a SIP-based INVITE message to SIP module 106.

At block 812, process 800 may in response to processing the signaling message, delete at least one of the transaction instance and the call instance. For example, for a call teardown transaction, both call 1 210 and transaction 1 218 may be deleted. For a call hold transaction, transaction 1 218 may be deleting without deleting call 1 210.

Figure 9:
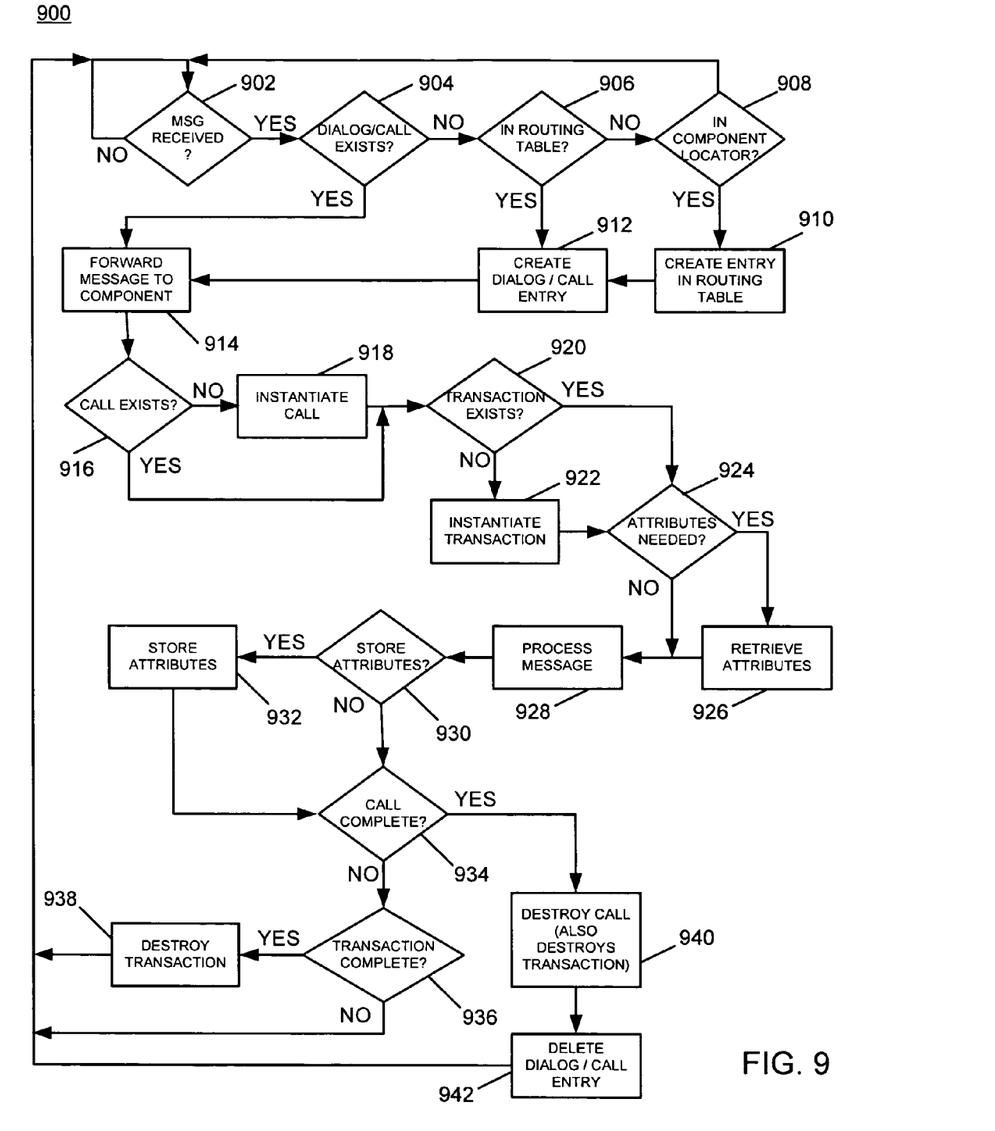
FIG. 9 illustrates an exemplary transaction-based call process for processing calls based upon a transactional call model using a three-level lookup for message routing and transaction instantiation for message processing according to an embodiment of the subject matter described herein.

FIG. 9 illustrates an exemplary transaction-based call process 900 for processing calls based upon a transactional call model using a three-level lookup for message routing and transaction instantiation for message processing. Transaction-based call process 900 may run on a SIP node, such as SIP node 102.

At decision point 902, transaction-based call process 900 may wait for a message, such as for example, a SIP message, to be received. In response to receiving a message, transaction-based call process 900 may begin a three-level lookup by determining whether an existing dialog or call that is associated with the message at decision point 904. When process 900 determines that there is not an existing dialog or call associated with the received message, process 900 may perform a second-level lookup by determining whether a component associated with the message has an active entry in a routing table at decision point 906. When there is no active entry for the associated component in the routing table at decision point 906, process 900 may perform a third-level lookup by searching a component locator database at decision point 908 to locate a component definition for the component associated with the received message. Though not shown in FIG. 9, appropriate error-handling procedures may be implemented in the event that a component definition may not be located at decision point 908.

When a component is located in a component locator database at decision point 908, an entry may be created in a routing table at block 910. At block 912, in response to either creating an entry in a routing table at block 910 or locating a routing table entry at decision point 906, process 900 may create a dialog or call entry in a dialog/call database.

Upon creation of a dialog or call entry at block 912 or when an existing dialog or call associated with the message has been identified at decision point 904, the received message may be forwarded to the component at block 914.

At decision point 916, process 900 may determine whether an active call associated with the received message exists. Upon a determination that an active call does not exist, process 900 may instantiate a call at block 918. In response to instantiation of the call at block 918 or when an active call has been determined to exist at decision point 916, process 900 may determine whether a transaction for processing the received message exists at decisions point 920. When a transaction for processing the received message does no9t exist, process 900 may instantiate a transaction for message processing at block 922.

When either a transaction already exists, as determined at decision point 920, or when a transaction is instantiated at block 922, process 900 may determine whether any existing attributes are needed by the instantiated transaction in order to process the received message at decision point 924. If attributes are needed, attributes may be retrieved from an attributes area at block 926. At block 928, in response to retrieving attributes at block 926 or upon a determination that attributes are not needed at decision point 924, process 900 may process the received message.

Upon completion of message processing by the instantiated transaction or at any time during processing of the received message, process 900 may determine whether to store attributes in an attributes area for use by a later-instantiated transaction at decision point 930. Upon a determination to store attributes, process 900 may store attributes at block 932.

In response to storing attributes at block 932 or a determination not to store any attributes for the call at decision point 930, a determination may be made at decision point 934 as to whether call processing is complete for the call associated with the received message. If the call has not been completed, process 900 may determine at decision point 936 whether the transaction is completed. If the transaction is completed, process 900 may destroy the instantiated transaction at block 938. When the transaction is destroyed at block 938 or when a determination has been made at decision point 936 that the transaction is not complete, process 900 may return to decision point 902 to await receipt of a new message. If a determination is made at decision point 934 the call is complete, process 900 may destroy the call at block 940. As described above, destroying a call may also destroy any associated transactions to release instantiated resources of both the call and any transactions from the system. As well, any attributes that are associated with the call may also be destroyed when a call is destroyed, while attributes associated with the component may persist. At block 942, process 900 may delete the dialog or call entry from the dialog/call database and may return to decision point 902 to await receipt of a new message.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for transaction-based Internet protocol (IP) telephony call processing, the method comprising:
   (a) receiving, at an IP telephony node, a signaling message associated with an IP telephony event associated with a voice over IP (VoIP) telephone call;
   (b) in response to receiving the signaling message, performing a search in at least one of a dialog/call database, a routing table, and a component locator database, wherein the search provides routing information to identify a component associated with the signaling message, instantiating, on demand at run time and by a component-level transaction factory, an IP telephony transaction instance associated with the component to process the signaling message, wherein the component is identified in the dialog/call database, wherein the IP telephony transaction instance performs a well-defined call processing task associated with managing a portion of call processing for the VoIP telephone call, wherein the well-defined call processing task includes one of: call setup, call teardown, and digit collection, wherein the IP telephony transaction instance is reused at multiple call processing stages of the IP telephony event; and
   (c) processing the signaling message using the IP telephony transaction instance; and
   (d) instantiating at least one additional IP telephony transaction instance for the call to handle a service feature for the call, wherein the service feature includes one of: call waiting, call hold, and call forwarding.

2. The method of claim 1 wherein the IP telephony event is selected from a group consisting of a SIP registration event, a SIP call setup event, and a SIP call teardown event.

3. The method of claim 1 wherein the IP telephony event is associated with a protocol selected from the group consisting of SIP, H.323, and SS7 over IP.

4. The method of claim 1 wherein receiving, at an IP telephony node, a signaling message associated with an IP telephony event includes receiving the signaling message over an application programming interface (API).

5. The method of claim 1 wherein the signaling message comprises a SIP INVITE message and wherein the method further comprises creating a dialog entry associated with the IP telephony event in a dialog/call database.

6. The method of claim 1 wherein processing the signaling message using the transaction instance includes reading attributes associated with the IP telephony event from a call attributes area associated with the transaction instance.

7. The method of claim 1 wherein processing the signaling message using the transaction instance includes writing attributes associated with the IP telephony event to a call attributes area associated with the transaction instance.

8. The method of claim 1 wherein processing the signaling message using the transaction instance includes formulating and sending a binary-based SIP message associated with the signaling message.

9. The method of claim 1 wherein processing the signaling message using the transaction instance includes formulating and sending a text-based SIP message associated with the signaling message.

10. The method of claim 1 wherein the signaling message is selected from a group consisting of a SIP INVITE message, a SIP RE-INVITE message, a SIP 100 message, a SIP 180 message, a SIP 200 OK message, a SIP ACK message, and a SIP BYE message.

11. The method of claim 1 comprising, in response to processing the signaling message, deleting the transaction instance.

12. A system for transaction-based Internet protocol (IP) telephony call processing, the system comprising:
 (a) at least one database for storing information for instantiating instances corresponding to IP telephony components and IP telephony transactions;
 (b) an IP-service-based application server for receiving a signaling message associated with an IP telephony event associated with a voice over IP (VoIP) telephone call, for instantiating an IP telephony transaction instance to process the signaling message using information in the at least one database and perform a well-defined call processing task associated with managing a portion of call processing for the VoIP telephone call, wherein the well-defined call processing task includes one of: call setup, call teardown, and digit collection, wherein the IP telephony transaction instance is reused at multiple call processing stages of the IP telephony event, wherein the IP transaction instance is instantiated in the at least one database by a component-level transaction factory in response to the IP telephony event on demand at run time, and the IP service-based application server for instantiating at least one additional IP telephony transaction instance for the call to handle a service feature for the call, wherein the service feature includes one of: call waiting, call hold, and call forwarding; and
 (c) a message routing module, a dialog/call database, a routing table, and a component locator database, wherein the message routing module is adapted to identify a component associated with the signaling message by performing a search in at least one of the dialog/call database, the routing table, and the component locator database, wherein the message routing module is adapted to forward the signaling message to the component in response to identifying the component associated with the signaling message in the dialog/call database.

13. The system of claim 12 wherein the IP telephony event includes an event selected from a group consisting of a SIP registration event, a SIP call setup event, and a SIP call teardown event.

14. The system of claim 12 wherein the signaling message is of a protocol selected from the group consisting of SIP, H.323, and SS7 over IP.

15. The system of claim 12 wherein the IP-service-based application server is adapted to receive the signaling message over an application programming interface (API).

16. The system of claim 12 wherein the message routing module is adapted to forward the signaling message to the component in response to identifying the component associated with the signaling message in the routing table.

17. The system of claim 12 wherein the message routing module is adapted to forward the signaling message to the component in response to identifying the component associated with the signaling message in the component locator database.

18. The system of claim 12 comprising wherein the message routing module is adapted to receive the signaling message and forward the signaling message to the IP-service-based application server using an application programming interface (API).

19. The system of claim 12 wherein the signaling message comprises a SIP INVITE message, wherein the message routing module is adapted to create a dialog entry associated with the signaling message in the dialog/call database.

20. The system of claim 12 wherein the message routing module is adapted to, in response to a deletion of the IP telephony transaction instance, delete a dialog entry associated with the signaling message from the dialog/call database.

21. The system of claim 12 comprising a call attributes area adapted to store attributes associated with the signaling message and wherein the transaction instance is adapted to read attributes associated with the signaling message from the call attributes area to process the signaling message.

22. The system of claim 12 comprising a call attributes area adapted to store attributes associated with the signaling message and wherein the IP telephony transaction instance is adapted to write attributes associated with the signaling message to the call attributes area in response to processing the signaling message.

23. The system of claim 12 wherein the transaction instance is adapted to process the signaling message by formulating and sending a binary-based SIP message associated with the signaling message.

24. The system of claim 12 wherein the transaction instance is adapted to process the signaling message by formulating and sending a text-based SIP message associated with the signaling message.

25. The system of claim 12 wherein the signaling message is selected from a group consisting of a SIP INVITE message, a SIP RE-INVITE message, a SIP 100 message, a SIP 180 message, a SIP 200 OK message, a SIP ACK message, and a SIP BYE message.

26. The system of claim 12 comprising an application module adapted to instantiate a component associated with the signaling message in response to a SIP REGISTER message.

27. The method of claim 12 comprising, in response to processing the signaling message, deleting the transaction instance.

28. A computer program product comprising computer-executable instructions embodied in a non-transitory computer-readable medium for performing steps comprising:
 (a) receiving, at an IP telephony node, a signaling message associated with an IP telephony event associated with a voice over IP (VoIP) telephone call;
 (b) in response to receiving the signaling message, performing a search in at least one of a dialog/call database, a routing table, and a component locator database, wherein the search provides routing information to identify a component associated with the signaling message, instantiating, on demand at run time and by a component-level transaction factory, an IP telephony transaction instance associated with the component to process the signaling message, wherein the component is identified in the dialog/call database, wherein the IP telephony transaction instance performs a well-defined call processing task associated with managing a portion of call processing for the VoIP telephone call, wherein the well-defined call processing task includes one of: call setup, call teardown, and digit collection, wherein the IP telephony transaction instance is reused at multiple call processing stages of the IP telephony event; and
 (c) processing the signaling message using the IP telephony transaction instance; and
 (d) instantiating at least one additional IP telephony transaction instance for the call to handle a service feature for the call, wherein the service feature includes one of: call waiting, call hold, and call forwarding.

* * * * *